(12) United States Patent
Boraggina (10) Patent No.: US 11,712,933 B2
(45) Date of Patent: Aug. 1, 2023

(54) RETRACTABLE TOW ROPE

(71) Applicant: Toyota Motor Engineering & Manufacturing North America, Inc., Plano, TX (US)

(72) Inventor: Alexander T. Boraggina, Ottawa Lake, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 686 days.

(21) Appl. No.: 16/740,268

(22) Filed: Jan. 10, 2020

(65) Prior Publication Data
US 2021/0213790 A1 Jul. 15, 2021

(51) Int. Cl.
*B60D 1/18* (2006.01)

(52) U.S. Cl.
CPC ............. *B60D 1/185* (2013.01); *B60D 1/187* (2013.01)

(58) Field of Classification Search
CPC .......... B60D 1/185; B60D 1/187; D07B 1/18; Y10S 254/14
USPC ................................ 242/397; 280/480.1, 480
See application file for complete search history.

(56) References Cited

U.S. PATENT DOCUMENTS

| | | | |
|---|---|---|---|
| 1,386,052 A | 8/1921 | Duggan | |
| 1,536,383 A * | 5/1925 | French | B66D 1/34 254/DIG. 14 |
| 1,537,213 A * | 5/1925 | Wylie | B60D 1/38 242/379.2 |
| 1,924,922 A | 10/1931 | Gehrig | |
| 1,901,439 A * | 3/1933 | Drew | D07B 1/18 87/8 |
| 2,194,623 A * | 3/1940 | Thompson | B60D 1/185 280/505 |
| 2,878,013 A * | 3/1959 | Piodi | B60D 1/182 280/480 |
| 3,098,463 A * | 7/1963 | Brown | B63B 34/67 242/390.8 |
| 3,227,126 A | 6/1964 | Etzler | |
| 3,643,887 A * | 2/1972 | Kuhl | B60P 3/12 242/381 |
| 3,827,650 A * | 8/1974 | Stevens | B60P 7/083 242/379.2 |
| 3,881,751 A * | 5/1975 | Colby | B60D 1/185 280/480 |

(Continued)

FOREIGN PATENT DOCUMENTS

| | | | |
|---|---|---|---|
| CN | 204056354 U | * | 12/2014 |
| DE | 479293 C | * | 7/1929 |

(Continued)

*Primary Examiner* — Minnah L Seoh
*Assistant Examiner* — Myles A Harris
(74) *Attorney, Agent, or Firm* — Snell & Wilmer LLP (57) ABSTRACT

Methods, systems, devices and apparatuses for a retractable tow rope system. The retractable tow rope system includes a tow rope. The tow rope has a first end, a second end, a notch in between the first end and the second end, and an anchoring device. The anchoring device is positioned at the first end of the top rope and configured to couple with an object. The retractable tow rope system includes a reel apparatus. The reel apparatus is coupled to the second end of the tow rope and has a rope hook. The rope hook is configured to latch onto or unlatch from the notch.

19 Claims, 6 Drawing Sheets

(56) References Cited

U.S. PATENT DOCUMENTS

| | | | | |
|---|---|---|---|---|
| 4,030,776 | A | * | 6/1977 | Bricknell ................ E02D 3/02 280/477 |
| 4,238,086 | A | * | 12/1980 | Brimmeier ........... B65H 75/406 242/405 |
| 4,271,401 | A | * | 6/1981 | Meo ........................ B60D 1/28 340/687 |
| 4,302,026 | A | * | 11/1981 | Herman ............. B60R 16/0235 335/219 |
| 5,054,806 | A | | 10/1991 | Chester |
| 5,156,355 | A | * | 10/1992 | Wadle ..................... B65H 57/20 242/366.3 |
| 5,341,758 | A | | 8/1994 | Strickland |
| 5,350,186 | A | * | 9/1994 | Hull ....................... B60D 1/185 242/379.2 |
| 5,476,280 | A | * | 12/1995 | MacMullan ........... B60D 1/185 242/379.2 |
| 5,522,582 | A | * | 6/1996 | Dilks ....................... B66D 1/40 254/323 |
| 5,615,844 | A | * | 4/1997 | Bosch .................. B65H 75/406 242/396.5 |
| 5,664,918 | A | * | 9/1997 | Heider ................... B60P 7/083 410/104 |
| 5,688,011 | A | * | 11/1997 | Gulley ..................... B66C 1/18 294/74 |
| 5,967,496 | A | * | 10/1999 | Ulrich ..................... B66D 1/36 254/326 |
| 5,975,454 | A | * | 11/1999 | Potter .................. B65H 54/585 242/405 |
| 5,975,552 | A | * | 11/1999 | Slaton ..................... B60D 1/38 280/479.3 |
| D418,301 | S | * | 1/2000 | Anderson ..................... D3/327 |
| 6,092,826 | A | * | 7/2000 | Pingel ..................... B60D 1/18 280/480 |
| 6,331,024 | B1 | * | 12/2001 | Gulley ..................... B66C 1/18 294/74 |
| 6,896,281 | B2 | | 5/2005 | Lenzen, Jr. et al. |
| 6,951,345 | B2 | * | 10/2005 | Wilks ....................... B60D 1/38 254/326 |
| 7,306,417 | B2 | | 12/2007 | Dorstewitz |
| 7,731,218 | B2 | | 6/2010 | McGinnis et al. |
| 7,805,816 | B1 | * | 10/2010 | Thorne, III ........... B60P 7/0823 24/301 |
| 7,946,524 | B1 | * | 5/2011 | Meyers ................. B65H 75/285 24/336 |
| 8,065,971 | B2 | * | 11/2011 | Loisel, Jr. ............... B63B 59/02 114/223 |
| 8,684,390 | B1 | * | 4/2014 | Barrette ................. B60D 1/185 242/378.1 |
| 8,819,955 | B2 | * | 9/2014 | Chapin ................ G01B 3/1003 33/761 |
| 9,016,643 | B2 | | 4/2015 | Sterling |
| 10,159,314 | B2 | | 12/2018 | Kirth et al. |
| 10,814,149 | B2 | * | 10/2020 | Liggett ............... A62B 35/0075 |
| 2005/0029381 | A1 | * | 2/2005 | Lamonica ............... B63B 34/67 242/385.4 |
| 2006/0100052 | A1 | * | 5/2006 | Drayer ..................... D07B 1/18 474/242 |
| 2006/0103111 | A1 | * | 5/2006 | Popham .................... B60D 1/40 280/478.1 |
| 2008/0238037 | A1 | * | 10/2008 | McGinnis ................ B60D 1/18 280/480.1 |
| 2015/0259852 | A1 | * | 9/2015 | Matsumoto ........... A01K 27/005 428/369 |
| 2018/0354399 | A1 | * | 12/2018 | Ellis ...................... B60P 1/6454 |
| 2019/0118595 | A1 | * | 4/2019 | Yoshizaki ................ B60D 1/40 |
| 2022/0041402 | A1 | * | 2/2022 | Russo ................... B60P 7/0846 |

FOREIGN PATENT DOCUMENTS

| | | | | |
|---|---|---|---|---|
| EP | 1661758 | B1 | * | 1/2009 ............ B60P 7/0823 |
| FR | 2655009 | A1 | | 5/1991 |
| GB | 755430 | A | * | 8/1956 |
| GB | 755430 | A | | 8/1956 |
| GB | 2237548 | A | | 8/1991 |
| GB | 2223244 | B | | 4/1999 |
| JP | 2004203174 | A | * | 7/2004 |
| KR | 19980043893 | U | | 9/1998 |
| WO | WO-9511810 | A1 | * | 5/1995 ............ B60D 1/185 |

* cited by examiner

RETRACTABLE TOW ROPE

BACKGROUND

Field

This disclosure relates to a system, method, apparatus and/or device for an adjustable tow rope.

Description of the Related Art

Towing involves the coupling of two or more objects together so that at least one of the objects can be pulled or moved. For example, a truck or other towing vehicle may tow another object, such as a vehicle. The towing vehicle may use a tow rope, tow strap or other device (hereinafter, simply referred to as a "tow rope") to couple with the towed object to move or pull the towed object. The tow rope, tow strap or other device couples the tow hitch of the towing vehicle with the towed object allowing the towing vehicle to move or pull the towed object.

Generally, the tow rope, tow strap or other anchoring device is a fixed length and not adjustable. The towing vehicle must move the fixed length before enough tension forms within the tow rope to pull or move the towed object. In tight spaces, the towing vehicle may have difficulty in towing the towed object when there is insufficient room to remove the slack from the tow rope to form enough tension to move the towed object. And, since there is slack between the tow hitch of the towing vehicle and the towed object, the towing vehicle is unable to move, pull or otherwise tow the towed object.

Accordingly, there is a need for a system, apparatus, method and/or device to shorten or lengthen the length of the tow rope that extends outward from the towing vehicle to the towed object to adjust the amount of slack within the tow rope.

SUMMARY

In general, one aspect of the subject matter described in this disclosure may be embodied in a retractable tow rope system for a vehicle. The retractable tow rope system includes a tow rope. The tow rope has a first end, a second end, a notch in between the first end and the second end, and an anchoring device. The anchoring device is positioned at the first end of the top rope and configured to couple with an object. The retractable tow rope system includes a reel apparatus. The reel apparatus is coupled to the second end of the tow rope and has a rope hook. The rope hook is configured to latch onto or unlatch from the notch.

These and other embodiments may optionally include one or more of the following features. The rope hook may be configured to latch onto the notch and secure the tow rope such that a first portion of the tow rope is in a released position and a second portion of the tow rope is in a retracted position within the reel apparatus. The reel apparatus may be configured to release or retract the tow rope when the rope hook is unlatched from the notch.

The notch may include multiple notches. The multiple notches may be positioned or spaced apart along a length of the tow rope. The multiple notches may be positioned or spaced apart an equidistant along the length of the tow rope. The multiple notches may include a first notch, a second notch and a third notch. A first length of the tow rope may be between a first notch and a second notch. A second length of the tow rope may be between a second notch and a third notch. The first length may be greater than the second length.

The tow rope may be coupled and secured to a tow hitch of the vehicle. The retractable tow rope system may include a pulley. The pulley may be configured to redirect a direction of the tow rope through a center of a rear of the vehicle to the coupled object via the tow hitch and from the reel apparatus. The reel apparatus may be positioned near a wheel or exhaust of the vehicle.

In another aspect, the subject matter may be embodied in a retractable tow rope system for a vehicle. The retractable tow rope system has a tow rope. The tow rope has a first end, a second end, multiple notches in between the first end and the second end, and an anchoring device. The anchoring device is positioned at the first end of the top rope and configured to couple with an object. The retractable tow rope system includes a reel apparatus coupled to the second end of the tow rope. The reel apparatus has an attachment device that is configured to couple with one of the multiple notches.

In another aspect, the subject matter may be embodied in a retractable tow rope system for a vehicle. The retractable tow rope system includes a tow rope. The tow rope has a first end, a second end, multiple notches in between the first end and the second end, and an anchoring device. The anchoring device is positioned at the first end of the top rope and configured to couple with an object. The retractable tow rope system includes a reel apparatus. The reel apparatus is positioned near a wheel of the vehicle and coupled to the second end of the tow rope. The reel apparatus has an attachment device that is configured to couple with one of the multiple notches. The retractable tow rope system includes a pulley. The pulley is configured redirect a direction of the tow rope through a center of a rear of the vehicle to the coupled object via the tow hitch and from the reel apparatus.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, apparatuses, and methods for a retractable and/or an adjustable tow rope system ("tow rope system"). The tow rope system has a built-in reel apparatus and an adjustable or retractable tow rope ("tow rope"). The tow rope has a hook, fastener or other anchoring device that couples or connects to the object, such as a vehicle, which is to be moved, pulled or otherwise towed (hereinafter, referred to as a "towed object"). The tow rope may be retracted into the spool of the built-in reel apparatus to shorten the length of the tow rope so that any slack in between the towing vehicle and the towed object is minimized, reduced or otherwise eliminated. This allows the towing vehicle to create tension within the tow rope with the towed object more easily and at a shorter adjustable distance than when there is a greater length of tow rope between the towing vehicle and the towed object. The tow rope may also be released from the spool to lengthen the length of the tow rope.

Other benefits and advantages include the capability to secure the tow rope in the retracted position so that the tow rope maintains tension while at the retracted length. The reel apparatus may have one or more rope hooks or other rope securing devices to latch, connect to, couple to or otherwise secure to one or more notches along the tow rope so that the towed object does not dislodge or pull the retracted tow rope from the retracted position within the reel apparatus.

Figure 1:
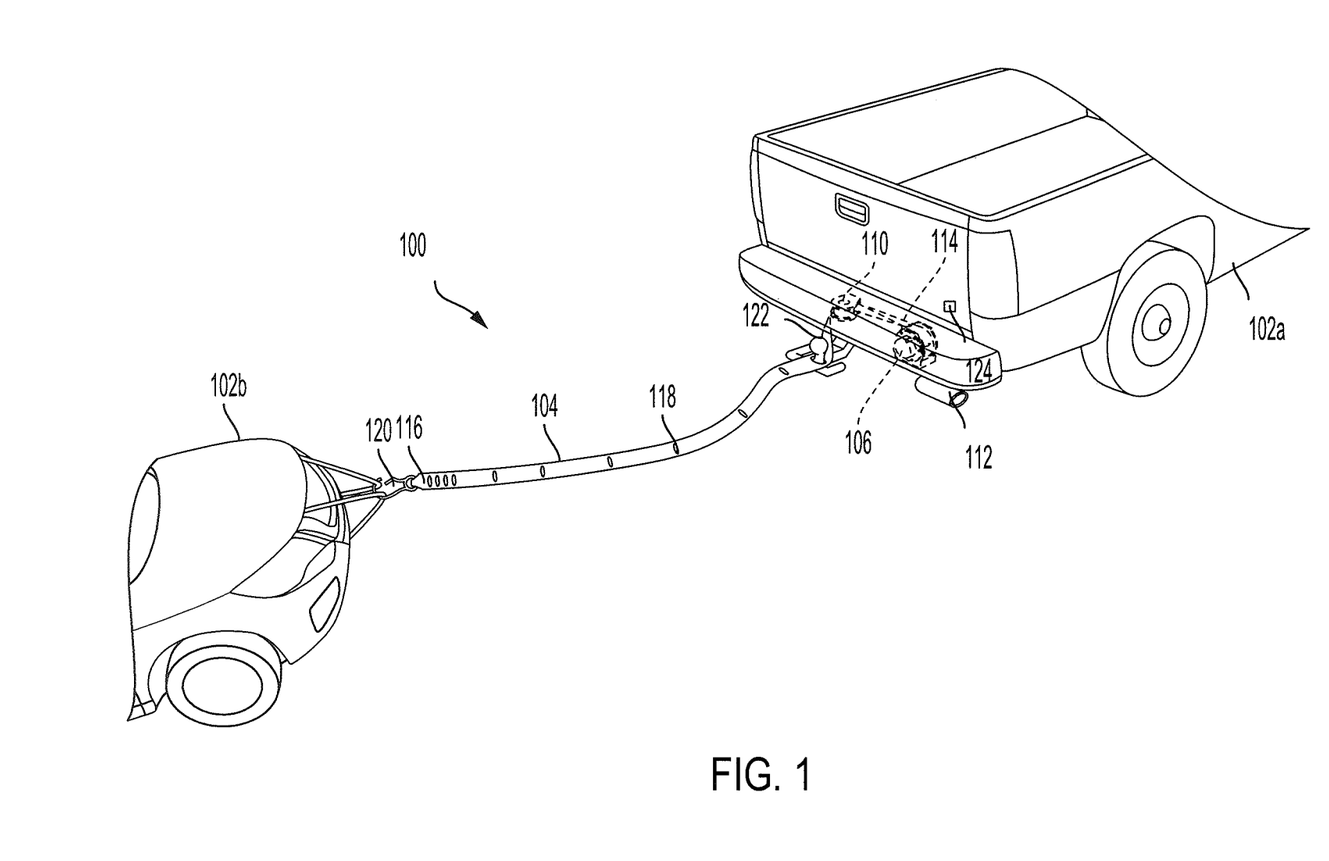
FIG. 1 shows an example retractable tow rope system according to an aspect of the invention.

FIG. 1 shows the tow rope system 100. The tow rope system 100 may be retro-fitted, coupled to, integrated with, include or be included within a vehicle 102a or may be entirely separate from the vehicle 102a. A vehicle 102a is a conveyance capable of transporting a person, an object, or a permanently or temporarily affixed apparatus. The vehicle 102a may be a self-propelled wheeled conveyance, such as a car, sports utility vehicle, truck, bus, van or other motor, battery or fuel cell driven vehicle. For example, the vehicle 102a may be an electric vehicle, a hybrid vehicle, a hydrogen fuel cell vehicle, a plug-in hybrid vehicle or any other type of vehicle that has a fuel cell stack, a motor and/or a generator. Other examples of vehicles include bicycles, trains, planes, or boats, and any other form of conveyance that is capable of transportation. The vehicle 102a may be semi-autonomous or autonomous. That is, the vehicle 102a may be self-maneuvering and navigate without human input. An autonomous vehicle may have and use one or more sensors and/or a navigation unit to drive autonomously.

The tow rope system 100 has a tow rope 104 and a reel apparatus 106. The tow rope system 100 may have a tow hitch 108 and/or a pulley 110. The tow rope system 100 may be coupled, retro-fitted or included with the vehicle 102a (hereinafter, referred to as the "towing vehicle"). The towing vehicle 102a may use the tow rope system 100 to tow another object (hereinafter, referred to as the "towed object"). The towed object may be another vehicle 102b, a trailer or other object, such as a log, a wheel, a carriage, an industrial pipe or a tire. The tow rope system 100 may retract, release or otherwise adjust a length of the tow rope 104 that is coupled to a tow hitch 108 of the towing vehicle 102a and the towed object to adjust the length of the tow rope 104 that extends outward from the towing vehicle 102a to the towed object. The tow rope system 100 may decrease the length of the tow rope 104 that extends outward, which increases the amount of tension of the tow rope 104 between the towing vehicle 102a and the towed object to pull, move or otherwise tow the towed object.

The tow rope system 100 includes a tow rope 104. The tow rope 104 may be an adjustable tow rope. An adjustable tow rope may be retracted or released by the reel apparatus 106 so that the length of the tow rope 104 between the towing vehicle 102a and towed object may be adjusted, e.g., reduced to increase the tension between the towing vehicle 102a and the towed object or released to increase the amount of slack between the towing vehicle 102a and the towed object. The tow rope 104 may be made from nylon, polyester, or other heavy duty fabric. In some implementations, the tow rope 104 may be a cable made from polysteel, stainless steel, or other heavy duty material. The tow rope 104 may be unbraided or braided to reinforce the strength of the tow rope 104 and may be a single contiguous piece or multiple contiguous pieces interlinked or chain-linked throughout the length of the tow rope 104. The tow rope 104 may be approximately 25 feet-30 feet in length and may or may not be reinforced.

The tow rope 104 may have a proximal end 114, a distal end 116 and/or one or more notches, slits or other openings 118. Proximal may refer to a position or direction closest to the towing vehicle 102a, and distal may refer to a position or direction away from the towing vehicle in the direction or position closest to the towed object. The proximal end 114 of the tow rope 104 may be fastened, coupled or otherwise connected to the reel apparatus 106 to allow the reel apparatus 106 to reel-in, gather, collect and/or release the tow rope 104. The proximal end 114 of the tow rope 104 may be wound around the reel apparatus 106 to reel-in, gather or collect the tow rope 104 within the reel apparatus 106. The distal end 116 of the tow rope 104 may be coupled to the towed object. The distal end 116 of the tow rope 104 may be fastened to a tow hitch of a towed vehicle 102b, for example. In some implementations, the distal end 116 may be tied around the towed object or around a portion of the towed object to secure the towed object.

The tow rope 104 may have a tow hook 120. The tow hook 120 may be fastened, coupled or otherwise positioned at the distal end 116 of the tow rope 104. The tow hook 120 may be a carabiner hook, rope hook or other fastening, coupling, connecting or anchoring device that fastens, couples or connects to the towed object, such as a tow hitch of the towed object. The tow hook 120 may also fasten, couple or connect to a fastening device, a notch, a slit or other opening, such as one of the openings 118 on the tow rope 104 after the tow rope 104 is wrapped around the towed object. The tow hook 120 secures the distal end 116 of the tow rope 104 to the towed object and allows the towed object to be pulled, moved or otherwise towed using the tow rope 104.

Figure 2A:
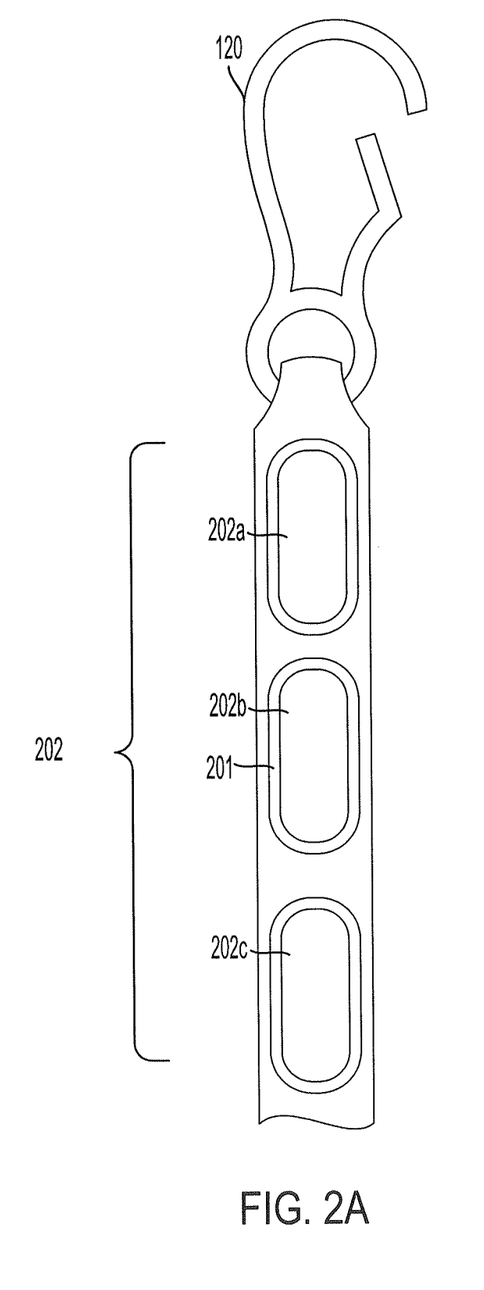
FIG. 2A shows an example tow rope of the tow rope system of FIG. 1 that has one or more notches according to an aspect of the invention.
Figure 2B:
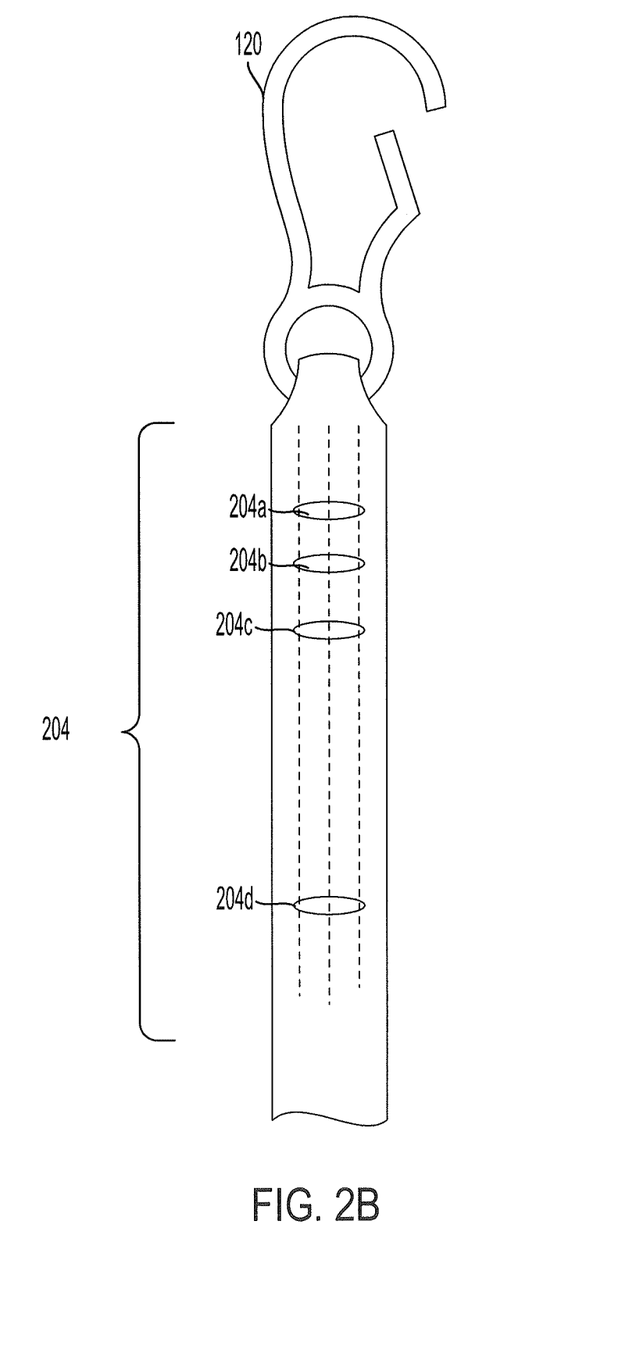
FIG. 2B shows an example tow rope of the tow rope system of FIG. 1 that has one or more slits according to an aspect of the invention.
Figure 2C:
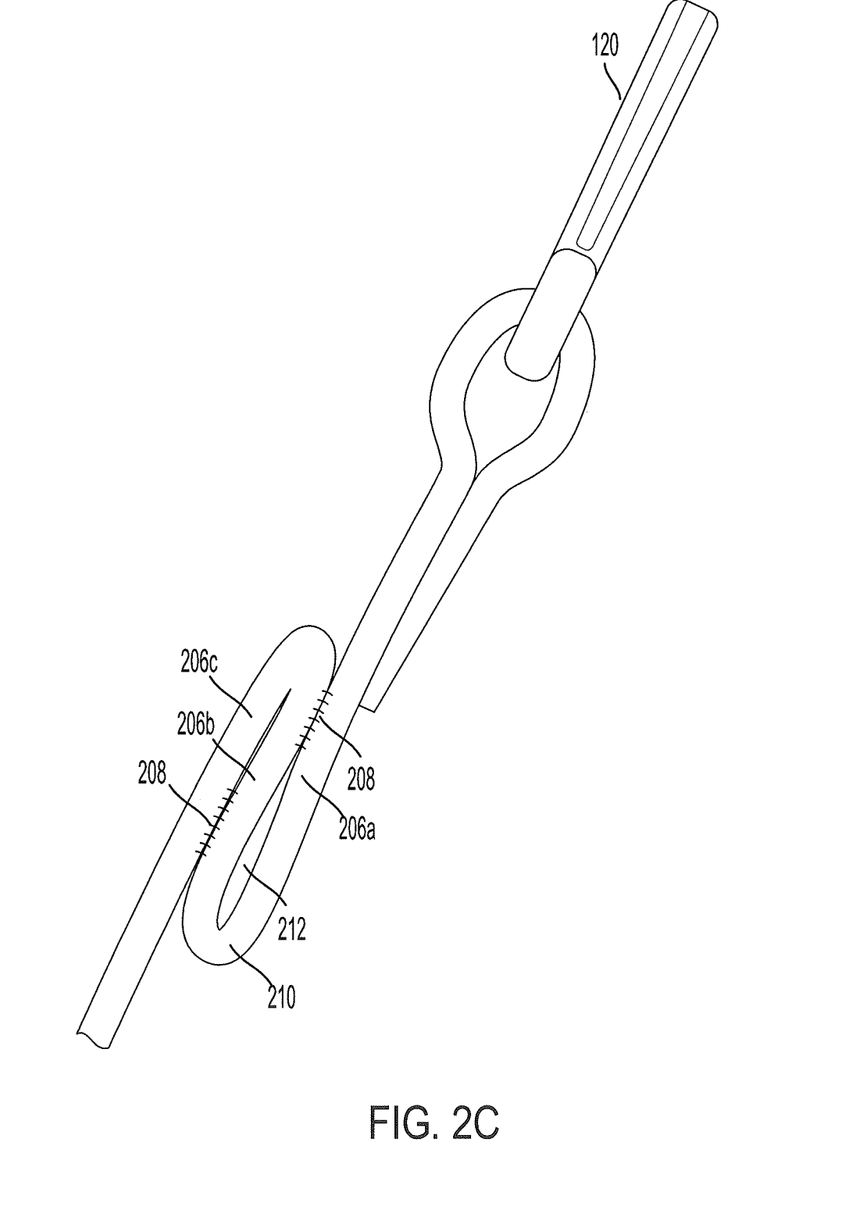
FIG. 2C shows an example tow rope of the tow rope system of FIG. 1 that is folded to form one or more openings according to an aspect of the invention.

The tow rope 104 may have one or more notches, slits or other openings 118 along a length of the tow rope 104. The tow rope 104 may have any combination of notches, slits or other openings 118 along the length of the tow rope 104. For example, the tow rope 104 could use both slits and/or notches. FIGS. 2A-2C show different implementations of the tow rope 104 having different notches, slits or other openings 118.

FIG. 2A shows a tow rope 104 having one or more notches 202. The tow rope 104 may have multiple notches 202a-c that extend along a length of the tow rope 104. The one or more notches 202 may define an opening shaped as an ellipsoid, a sphere or other polygonal shape within the fabric or material of the tow rope 104. Each edge of the openings of the one or more notches 202a-c may be reinforced. The edge may be folded, wrapped over itself and/or stitched to a portion of the tow rope 104 to form the reinforcement. In some implementations, the edge of the openings of the one or more notches 202a-c may be reinforced with a frame or bracket 201 made from metal or fabric. The reinforcement allows the rope hook 302 of the reel apparatus 106 to latch onto the one or more notches 202a-c and not tear or damage the fabric of the tow rope 104 when a tension or force is applied to the tow rope 104.

FIG. 2B shows the tow rope 104 having one or more slits 204. The tow rope 104 may have multiple slits 204a-d that extend along the length of the tow rope 104. Inner edges of each of the multiple slits 204a-d may be reinforced with stitching or other fabric so that the slits 204a-d do not tear, become damaged or further widen when the rope hook 302 of the reel apparatus 106 is latched on. The one or more slits 204 may be lateral across a width of the tow rope 104 or longitudinal along a length of the tow rope 104. The one or more slits 204 may be a small opening within the fabric or material of the tow rope 104 that allows the rope hook 302 of the reel apparatus 106 to be inserted or latched onto. The rope hook 302 of the reel apparatus 106 may latch onto the one or more slits 204 to secure a portion of the tow rope 104 within the reel apparatus 106 and to allow another portion of the tow rope 104 to secure onto the towed object to move or tow the towed object.

FIG. 2C shows multiple portions 206a-c of the tow rope 104 wrapped or folded over each other to form a corresponding opening 212. The multiple portions 206a-c of the tow rope 104 may be wrapped or folded over each other at different locations along the length of the tow rope 104 to form multiple corresponding openings 212. A first portion 206a may be wrapped or folded over a second portion 206b such that the first and second portions overlap. The second portion 206b may be wrapped or folded over a third portion 206c such that the second and third portions overlap. The different overlapping portions may be stitched 208 to form a loop 210. The loop 210 defines an opening 212. The rope hook 302 may be coupled to, inserted into or latched into the opening 212 to secure the tow rope 104 such that a portion of the tow rope 104 is wound or retracted within the reel apparatus 106 and another portion is slack or released from the reel apparatus 106 to couple with the towed object.

Figure 3:
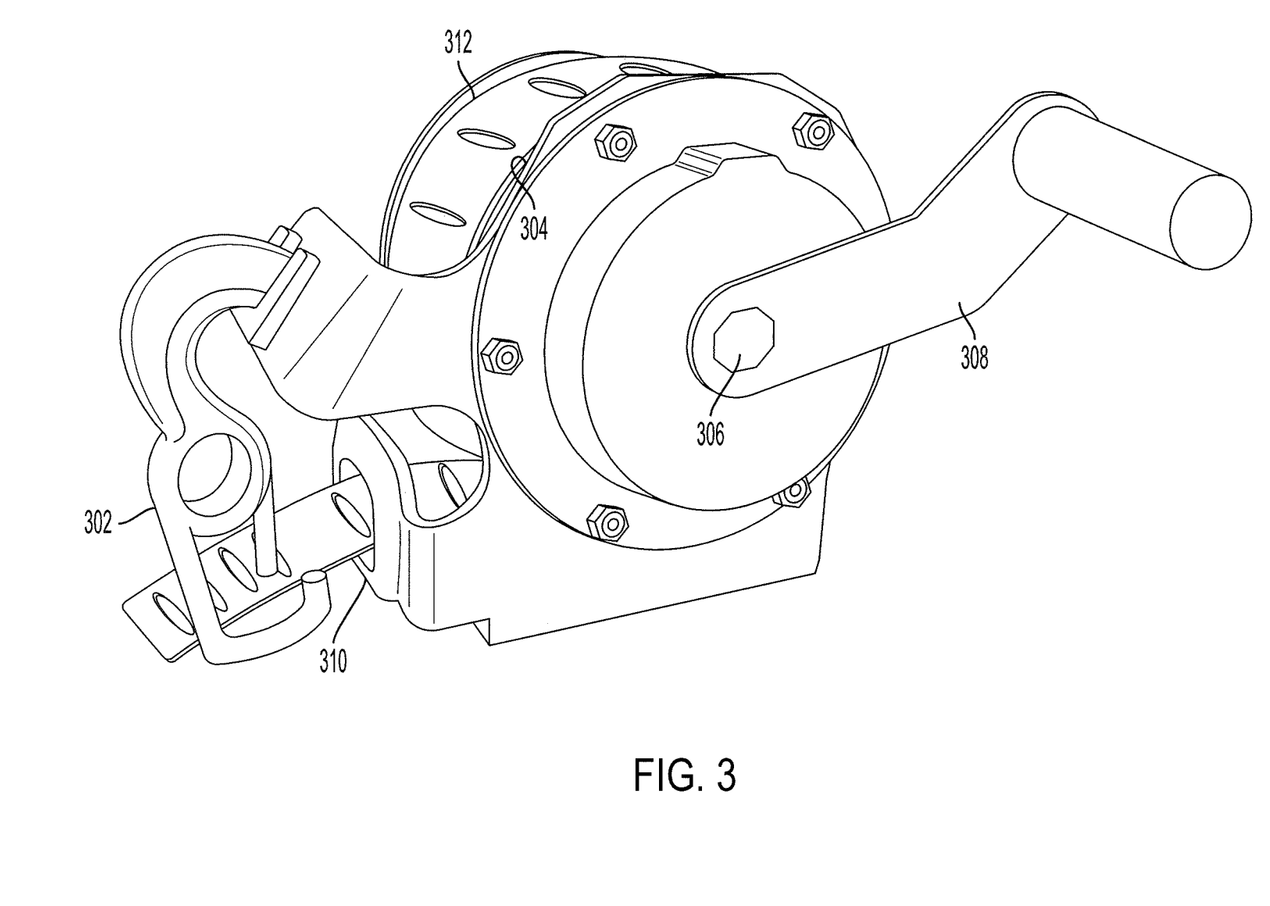
FIG. 3 shows an example reel apparatus of the tow rope system of FIG. 1 that retracts and/or releases the tow rope to adjust the length and slack of the tow rope according to an aspect of the invention.
Figure 4:
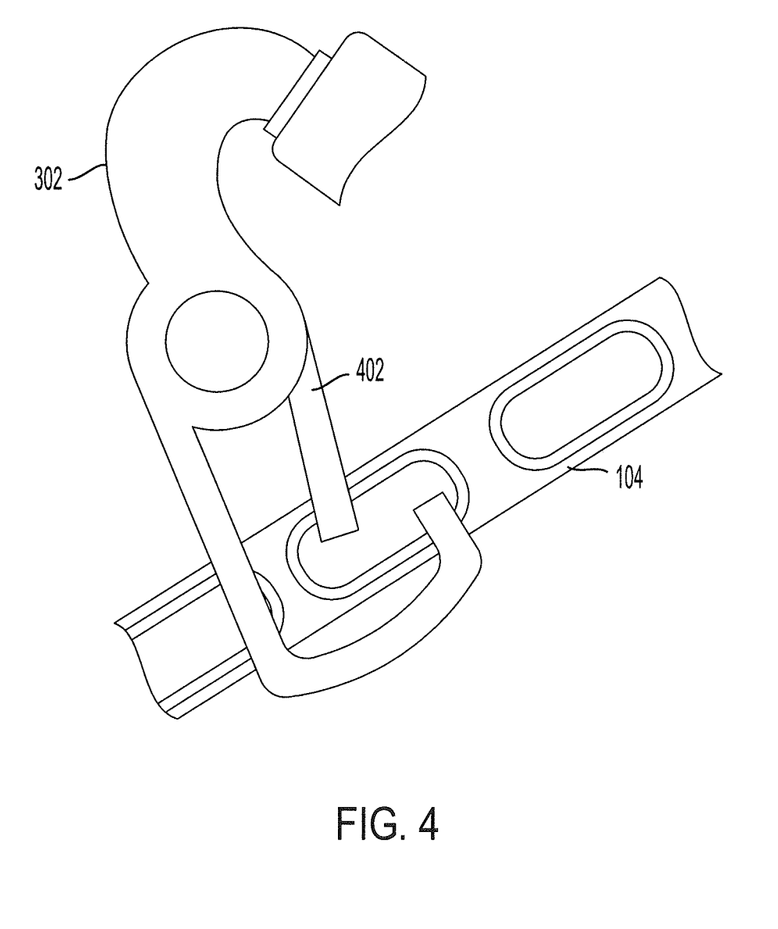
FIG. 4 shows an example notch hook of the real apparatus of the tow rope system of FIG. 1 that latches or hooks onto the tow rope secure the tow rope according to an aspect of the invention.

The one or more notches, slits or other openings 118 are used to adjust the length of the tow rope 104 between the towing vehicle 102a and the towed object so that the amount of slack is reduced, minimized and/or eliminated to create tension between the towing vehicle 102a and the towed object. The reel apparatus 106 may secure or latch onto the tow rope 104 using a rope hook 302, as shown in FIGS. 3-4 for example, to secure or latch onto the tow rope 104 via the one or more notches, slits or other openings 118 so the portion of the tow rope 104 between the towing vehicle 102a and the towed object is minimized and the remainder of the tow rope 104 within the reel apparatus 106 is not released or unwound.

The one or more notches, slits or other openings 118 may be spaced apart along the length of the tow rope 104 and may be positioned at different or equidistant intervals. The one or more notches, slits or other openings 118 may be positioned equidistant apart from each other along the length of the tow rope 104. For example, as shown in FIG. 2A, the distance or space between a first notch 202a and a second notch 202b, the distance or space between a second notch 202b and a third notch 202c, and the distance between all other adjacent notches 202 may be approximately the same. The distance between each of the adjacent notches 202 may be approximately 6 inches-12 inches in length. In some implementations, the one or more notches, slits or other openings 118 may have various different lengths between two notches, slits or other openings 118. For example, as shown in FIG. 2B, the distance or space between a first slit 204a and second slit 204b is shorter than the distance between the distance or space between the third slit 204c and the fourth slit 204d and the distance or space between the fourth slit 204d and the fifth slit 204e. The distance or space between two or more notches, slits or openings 118 may vary based on the proximity of the notches, slits or openings 118 to the proximal end 114 of the tow rope 104 and/or the distal end 116 of the tow rope 104. The one or more notches, slits or other openings 118 may be arranged such that the distance between two adjacent notches, slits or other openings 118 is greater when the two adjacent notches, slits or other openings 118 are positioned closer to the proximal end 114 of the tow rope 104 that is coupled to the reel apparatus 106 than when two adjacent notches, slits or other openings 118 are positioned closer to the distal end 116 of the tow rope 104. For example, toward the proximal end of the tow rope 104, there may be a notch, slit or other opening every 3 feet-4 feet, whereas toward the distal end of the tow rope 104, there may be a notch, slit or other opening every 6 inches to 1 foot. This allows the reel apparatus 106 to wind or retract the tow rope 104 a greater degree when there is a greater length of tow rope 104 that is not retracted and also allows the reel apparatus 106 to have greater fidelity when retracting the tow rope 104 when the towed object is near the towing vehicle 102a and there is a lesser length of tow rope 104 that is not retracted.

The tow rope system 100 includes a reel apparatus 106. The reel apparatus 106 may be positioned underneath the towing vehicle 102a near or in proximity to the passenger-side rear wheel and/or the exhaust 112 of the towing vehicle 102a. For example, the reel apparatus 106 may be positioned between the frame and the rear body of the towing vehicle 102a near the exhaust 112. In some vehicles, the reel apparatus 106 may be mounted within the 1.5 foot-2 feet clearance behind the rear passenger wheel.

The reel apparatus 106 may be positioned near the exhaust 112. The exhaust 112 may emit warmth or heat, which rises around or toward the reel apparatus 106. The warmth or heat may reduce, minimize, melt or otherwise defrost ice, frost or other precipitation from the reel apparatus 106 and the portion of the tow rope 104 within the reel apparatus 106.

The reel apparatus 106 may be coupled and secured to the proximal end 114 of the tow rope 104. The reel apparatus 106 may retract or wind the tow rope 104 to reduce a length of the tow rope 104 that extends outward. By reducing the length of the tow rope 104, the reel apparatus 106 reduces the amount of slack in the tow rope 104, which increases the tension in the tow rope 104 between the towing vehicle 102a and the towed object. Otherwise, a natural tension is created when the towing vehicle 102a moves forward and reduces the slack between the towed object and the towing vehicle 102a to pull, move or otherwise tow the towed object.

FIG. 3 shows the reel apparatus 106. The reel apparatus 106 includes a rope hook 302 or other latch and a spool 304. The reel apparatus 106 may include a crank hole 306 and a hand crank 308. The reel apparatus 106 may have a frame 310 that defines an opening to guide the tow rope 104 into the spool 304. The spool 304 may have a guide or channel 312 that aids, guides or otherwise channels the tow rope 104 to be wound in the spool 304. The reel apparatus 106 may have a spring (not shown) that biases the spool 304 or applies a force to wind the tow rope 104 around the spool 304 and allows the tow rope 104 to be self-wound and/or self-retracted. A self-winding or self-retracting reel apparatus 106 applies a force to retract or wind the tow rope 104 without the need for manual or human power or other power source to apply enough force to wind, retract or otherwise adjust the length of the tow rope 104.

In some implementations, the reel apparatus 106 is controlled using a hand crank 308. The hand crank 308 may be coupled with or inserted into a crank hole 306 within the reel apparatus 106 to rotate the spool 304 to wind or unwind the tow rope 104 from the spool 304 to retract or release the tow rope 104, respectively. The hand crank 308 may be used alone or in combination with the self-applied force to wind the tow rope 104 around the spool 304.

The towing vehicle 102a may have a crank opening 124 that allows access to the reel apparatus 106. The crank opening 124 may be located near the rear bumper of the towing vehicle 102a near the rear passenger side. The hand crank 308 may be inserted through the crank opening 124 to couple to the crank hole 306 to wind or unwind the spool 304. Both the hand crank 308 and/or the spring which applies self-applied force do not require additional mechanical mechanisms, which may be hampered by weather, such as ice or snow.

The reel apparatus 106 may have a rope hook 302 or other latch. The rope hook 302 or other latch may have an open configuration and a closed configuration. The rope hook 302 may be switched between the open configuration and the closed configuration, as shown in FIG. 4 for example. In the open configuration, the rope hook 302 or other latch is not coupled with the tow rope 104 and allows the tow rope 104 to move freely to be wound or unwound from the spool 304. In the closed configuration, the rope hook 302 or other latch is coupled with the tow rope 104 and secures a portion of the tow rope 104 within the reel apparatus 106. The rope hook 302 may hook onto one of one or more notches, slits or other openings 118 to couple with the tow rope 104 and secure the tow rope 104 within the reel apparatus 106. The rope hook 302 may have a snap 402 or other device that may be opened from or closed through one of the one or more notches, slits or other openings 118 to adjust the length of the tow rope 104 that extends outward toward the towed object.

The tow rope system 100 may include a pulley 110, roller, pivot or other device positioned toward the center of the rear of the towing vehicle 102a. The pulley 110, roller, pivot or other device redirects the tow rope 104 to and from the reel apparatus 106 when the reel apparatus 106 is not positioned within the center of the towing vehicle 102, such as when the reel apparatus 106 is positioned near or in proximity to the exhaust 112. The tow rope 104 may be partially wound or wrapped around the pulley 110 to redirect the direction of the tow rope 104. For example, when the reel apparatus 106 is positioned near the exhaust 112, the tow rope 104 may be directed laterally toward the center of the rear of the towing vehicle 102 and the pulley 110 may then redirect the tow rope 104 at an approximately right angle or 90 degrees outward from the center of the rear of the towing vehicle 102 toward the towed object. As a result, when the tow rope 104 tightens, such that there is little or no slack, the tow rope 104 extends directly outward from the center of the rear of the towing vehicle 102 and couples with the towed object to pull the towed object using a central force originating from the center of the rear of the towing vehicle 102a. Since the tow rope 104 extends outward from the center of the rear of the towing vehicle 102a, this reduces or minimizes any lateral or angular force that would cause the towed object to sway or otherwise move laterally.

The tow rope system 100 may include a tow hitch 108. A tow hitch 108 is a device which may be attached to the chassis of the rear of the towing vehicle 102. The tow hitch 108 may have a tow knob 122 that may be inserted into the one or more notches, slits or other openings 118 of the tow rope 104 to secure or couple with the tow rope 104. In some implementations, the tow rope 104 may wrap around the tow knob 122 or other portion of the tow hitch 108 to secure the tow rope 104. By securing the tow rope 104 onto the tow hitch 108 of the towing vehicle 102a, the towing vehicle 102 may pull, move or otherwise tow a towed object coupled to and on the other end of the tow rope 104. In order to retract or release the tow rope 104 to decrease or increase the slack of the tow rope, respectively, the tow rope 104 may need to also be unsecured from the tow hitch 108.

The tow rope 104 may have multiple portions of varying adjustable lengths that extend among the reel apparatus 106, the pulley 110, the tow hitch 108 and/or the towed object. A first portion of the tow rope 104 is spooled within the reel apparatus 106. For example, 10 feet of the tow rope 104 may be initially be wound and/or retracted within the reel apparatus 106. Another portion of the tow rope 104 comes across towards center of the towing vehicle 102a towards the license plate behind the rear bumper of the towing vehicle 102a. For example, a foot of the tow rope 104 may extend between the reel apparatus 106 and the pulley 110. This other portion may be redirected by the pulley 110 to extend outward from the license plate or from underneath of the bumper toward the towed object. For example, the license plate may flip out of the way to allow the tow rope 104 to extend outward. The proximal end of the extended portion of the tow rope 104 may hook onto the tow hitch 108, and the distal end of the extended portion of the tow rope 104 may have a tow hook 120, which may be used to couple with the towed object. For example, the remaining 28 feet of the tow rope 104 may extend outward from the rear of the towing vehicle 102a to the towed object. The various lengths of the portions of the tow rope 104 may be adjusted by winding and unwinding the tow rope 104 from the reel apparatus 106.

In some implementations, the reel apparatus 106 is positioned directly behind or near the license plate toward the rear of the towing vehicle 102a. When positioned in the central rear area of the towing vehicle 102a, the tow rope 104 does not need to be redirected to be aligned with the center of the towing vehicle 102a so that the towed object is aligned with the center of the towing vehicle 102 when being towed.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A retractable tow rope system for a vehicle, comprising:
    a tow rope configured to be coupled to a tow hitch of the vehicle, the tow rope having a first end, a second end, a notch in between the first end and the second end, and an anchoring device positioned at the first end of the tow rope and configured to couple with an object;
    a reel apparatus coupled to the second end of the tow rope and having a rope hook that is configured to latch onto or unlatch from the notch; and
    a pulley configured to redirect a direction of the tow rope through a center of a rear of the vehicle to the coupled object via the tow hitch and from the reel apparatus.

2. The retractable tow rope system of claim 1, wherein the rope hook is configured to latch onto the notch and secure the tow rope such that a first portion of the tow rope is in a released position and a second portion of the tow rope is in a retracted position within the reel apparatus.

3. The retractable tow rope system of claim 2, wherein the reel apparatus is configured to release or retract the tow rope when the rope hook is unlatched from the notch.

4. The retractable tow rope system of claim 1, wherein the notch includes a plurality of notches, wherein the plurality of notches are positioned or spaced apart along a length of the tow rope.

5. The retractable tow rope system of claim 4, wherein the plurality of notches are positioned or spaced apart an equidistant along the length of the tow rope.

6. The retractable tow rope system of claim 4, wherein the plurality of notches include a first notch, a second notch and a third notch, wherein a first length of tow rope is in between the first notch and the second notch and a second length of tow rope is between the second notch and the third notch, wherein the first length of tow rope is greater than the second length of tow rope.

7. The retractable tow rope system of claim 1,
wherein the reel apparatus is positioned near a wheel or an exhaust of the vehicle.

8. A retractable tow rope system for a vehicle, comprising:
a tow rope having a first end, a second end, a plurality of notches in between the first end and the second end, and an anchoring device positioned at the first end of the tow rope and configured to couple with an object;
a reel apparatus coupled to the second end of the tow rope and having an attachment device that is configured to couple with one of the plurality of notches; and
a pulley configured redirect a direction of the tow rope through a center of a rear of the vehicle to the coupled object via a tow hitch and from the reel apparatus.

9. The retractable tow rope system of claim 8, wherein the attachment device is configured to latch onto a notch of the plurality of notches and secure the tow rope such that a first portion of the tow rope is in a released position and a second portion of the tow rope is in a retracted position within the reel apparatus.

10. The retractable tow rope system of claim 9, wherein the attachment device is a rope hook, wherein the reel apparatus is configured to release or retract the tow rope when the rope hook is unlatched from the notch.

11. The retractable tow rope system of claim 8, wherein the plurality of notches are positioned or spaced apart along a longitudinal length of the tow rope.

12. The retractable tow rope system of claim 11, wherein the plurality of notches are positioned or spaced apart an equidistant along the longitudinal length of the tow rope.

13. The retractable tow rope system of claim 11, wherein the plurality of notches include a first notch, a second notch and a third notch, wherein a first length of tow rope is between the first notch and a second length of tow rope is between the second notch and the third notch, wherein the first length of tow rope is greater than the second length of tow rope.

14. The retractable tow rope system of claim 8, wherein, the tow rope is coupled to the tow hitch of the vehicle.

15. The retractable tow rope system of claim 8,
wherein the reel apparatus is positioned near a wheel of the vehicle.

16. A retractable tow rope system for a vehicle, comprising:
a tow rope having a first end, a second end, a plurality of notches in between the first end and the second end, and an anchoring device positioned at the first end of the tow rope and configured to couple with an object;
a reel apparatus positioned near a wheel of the vehicle and coupled to the second end of the tow rope, the reel apparatus having an attachment device that is configured to couple with one of the plurality of notches; and
a pulley configured redirect a direction of the tow rope through a center of a rear of the vehicle to the coupled object via the tow hitch and from the reel apparatus.

17. The retractable tow rope system of claim 16, wherein the plurality of notches are positioned or spaced apart along a longitudinal length of the tow rope.

18. The retractable tow rope system of claim 17, wherein the plurality of notches include a first notch, a second notch and a third notch, wherein a first length of tow rope is between the first notch and a second length of tow rope is between the second notch and the third notch, wherein the first length of tow rope is greater than the second length of tow rope.

19. The retractable tow rope system of claim 18, wherein the tow rope is coupled to a tow hitch of the vehicle.

* * * * *